United States Patent
Eastman et al.

(10) Patent No.: US 10,633,082 B2
(45) Date of Patent: Apr. 28, 2020

(54) HEAT RESISTANT SYSTEMS AND METHODS FOR COMPOSITE STRUCTURES

(71) Applicant: GOODRICH CORPORATION, Charlotte, NC (US)

(72) Inventors: Scott Alan Eastman, Glastonbury, CT (US); Mark R. Gurvich, Middletown, CT (US); Paul Papas, West Hartford, CT (US); Steven W. Gronda, Feeding Hills, MA (US); Rony Giovanni Ganis, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 134 days.

(21) Appl. No.: 15/430,073

(22) Filed: Feb. 10, 2017

(65) Prior Publication Data

US 2018/0229832 A1 Aug. 16, 2018

(51) Int. Cl.
*B64C 25/10* (2006.01)
*B05D 1/28* (2006.01)
(Continued)

(52) U.S. Cl.
CPC .............. *B64C 25/10* (2013.01); *B05D 1/02* (2013.01); *B05D 1/18* (2013.01); *B05D 1/28* (2013.01);
(Continued)

(58) Field of Classification Search
CPC .. B64C 25/10; B05D 1/02; B05D 1/18; B05D 1/28; B32B 2255/20; B32B 2255/205;
(Continued)

(56) References Cited

U.S. PATENT DOCUMENTS 4,371,579 A * 2/1983 McCaskey .............. B32B 19/02
428/204
4,861,643 A 8/1989 Scollard
(Continued)

FOREIGN PATENT DOCUMENTS

EP 1871579 6/2011
EP 2746045 7/2016
(Continued)

OTHER PUBLICATIONS

European Patent Office, European Search Report dated Jun. 14, 2018 in Application No. 18154437.0-1107.
(Continued)

*Primary Examiner* — Camie S Thompson
(74) *Attorney, Agent, or Firm* — Snell & Wilmer, L.L.P.

(57) ABSTRACT

A composite structure may comprise a composite core comprising a composite material, and a heat resistant system coupled to the composite core comprising a binder and/or at least one of a heat dissipation material or a thermal barrier material. The heat dissipation material may comprise boron nitride, graphene, graphite, carbon fiber, carbon nanotubes, aluminum foil, and/or copper foil, and the thermal barrier material may comprise montmorillonite, aluminum hydroxide, magnesium hydroxide, silicate glass, mica powder or flake, aluminum oxide powder, titanium dioxide powder, and/or zirconium oxide powder. The binder may comprise at least one of polyvinyl alcohol, polyvinyl alcohol copolyacetate, polyacrylamide, polyethylene glycol, polyethylenimine, polyurethane, polyester, or latex.

11 Claims, 5 Drawing Sheets

(51) Int. Cl.
| | |
|---|---|
| B05D 1/18 | (2006.01) |
| B05D 1/02 | (2006.01) |
| B32B 5/02 | (2006.01) |
| B32B 27/30 | (2006.01) |
| B32B 27/08 | (2006.01) |
| B32B 5/24 | (2006.01) |
| B32B 27/28 | (2006.01) |
| B32B 27/40 | (2006.01) |
| B32B 27/36 | (2006.01) |

(52) U.S. Cl.
CPC .............. *B32B 5/02* (2013.01); *B32B 5/022* (2013.01); *B32B 5/24* (2013.01); *B32B 27/08* (2013.01); *B32B 27/281* (2013.01); *B32B 27/306* (2013.01); *B32B 27/36* (2013.01); *B32B 27/40* (2013.01); *B32B 2255/02* (2013.01); *B32B 2255/06* (2013.01); *B32B 2255/20* (2013.01); *B32B 2255/205* (2013.01); *B32B 2255/26* (2013.01); *B32B 2260/046* (2013.01); *B32B 2262/101* (2013.01); *B32B 2262/103* (2013.01); *B32B 2262/106* (2013.01); *B32B 2264/101* (2013.01); *B32B 2264/102* (2013.01); *B32B 2264/104* (2013.01); *B32B 2264/105* (2013.01); *B32B 2264/107* (2013.01); *B32B 2264/108* (2013.01); *B32B 2307/304* (2013.01); *B32B 2307/306* (2013.01); *B32B 2307/3065* (2013.01); *B32B 2605/00* (2013.01); *B32B 2605/18* (2013.01)

(58) Field of Classification Search
CPC .......... B32B 2255/26; B32B 2260/046; B32B 2262/106; B32B 2262/101; B32B 2262/102; B32B 2264/105; B32B 2264/107; B32B 2264/108; B32B 2605/18; B32B 27/08; B32B 27/36; B32B 27/40; B32B 2308/306; B32B 2308/3065; B32B 19/02; B32B 2264/102; B32B 2264/104; B32B 2255/206; C09D 201/00; C09D 5/00; C09D 7/12; C08K 3/36; C08L 29/04; C08J 2329/04; C08J 5/18; D21H 21/34; D21H 27/30; D21H 5/0002; Y10S 428/92; Y10S 428/251; Y10S 428/256; Y10S 428/259
USPC ..... 428/292.1, 324, 328, 331, 920; 162/159, 162/181.6, 181.2
See application file for complete search history.

(56) References Cited

U.S. PATENT DOCUMENTS

| | | | |
|---|---|---|---|
| 6,951,162 | B1 | 10/2005 | Shockey et al. |
| 7,323,248 | B2 | 1/2008 | Ramsey |
| 7,622,518 | B2 | 11/2009 | Williams et al. |
| 7,928,160 | B2 | 4/2011 | Senkfor et al. |
| 8,083,878 | B1 | 12/2011 | Booth et al. |
| 8,535,578 | B2 | 9/2013 | Hansel et al. |
| 8,808,850 | B2 | 8/2014 | Dion et al. |
| 8,974,911 | B2 | 3/2015 | Nolte |
| 9,034,221 | B2 | 5/2015 | Kozlowski et al. |
| 9,085,678 | B2 | 7/2015 | Basfar et al. |
| 9,150,757 | B2 | 10/2015 | Massingill, Jr. et al. |
| 2007/0194172 | A1 | 8/2007 | Luce et al. |
| 2008/0063875 | A1* | 3/2008 | Robinson .................. B32B 1/08 428/426 |
| 2011/0114342 | A1 | 5/2011 | Ono |
| 2012/0148824 | A1 | 6/2012 | Martin et al. |
| 2015/0140306 | A1 | 5/2015 | Endo et al. |
| 2015/0190987 | A1 | 7/2015 | Gonzalez-Garcia |
| 2016/0340588 | A1 | 11/2016 | Bauer et al. |
| 2017/0050417 | A1 | 2/2017 | St. Rock et al. |
| 2018/0280741 | A1* | 10/2018 | Eastman .................. B64C 1/066 |

FOREIGN PATENT DOCUMENTS

| | | |
|---|---|---|
| JP | 2007254718 | 10/2007 |
| JP | 2011-120574 | * 11/2011 |
| JP | 2011-129754 | * 11/2011 |
| WO | 2016143371 | 9/2016 |

OTHER PUBLICATIONS

USPTO; U.S. Appl. No. 15/473,212, filed Mar. 29, 2017 entitled "Heat Resistant Systems and Methods".
USPTO; Pre-Interview First Office Action dated Jun. 27, 2019 in U.S. Appl. No. 15/473,212.

* cited by examiner

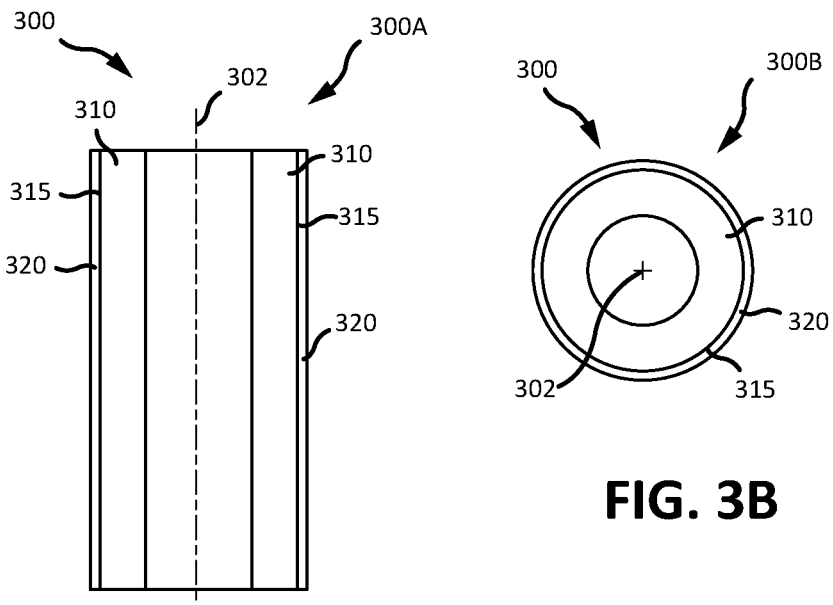
FIG. 3A
FIG. 3B
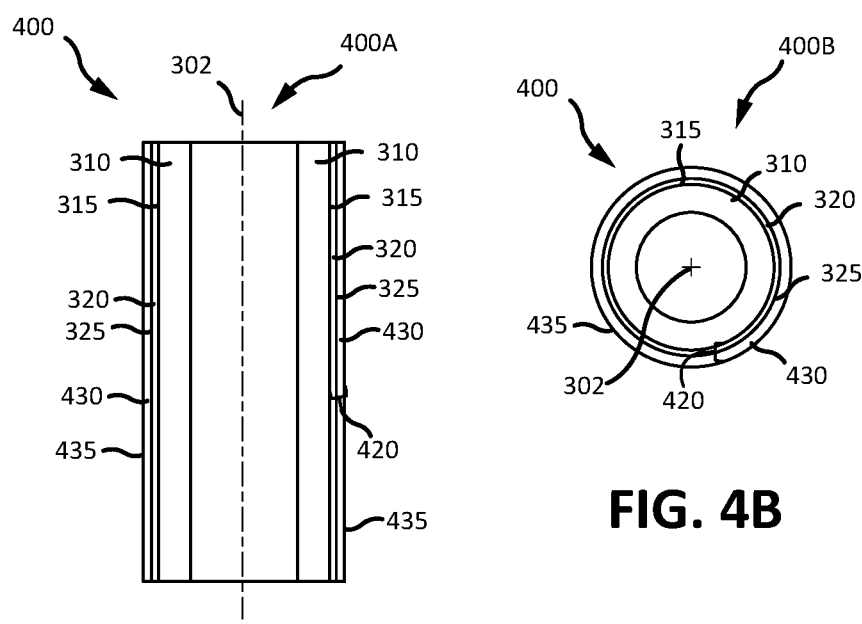
FIG. 4A
FIG. 4B

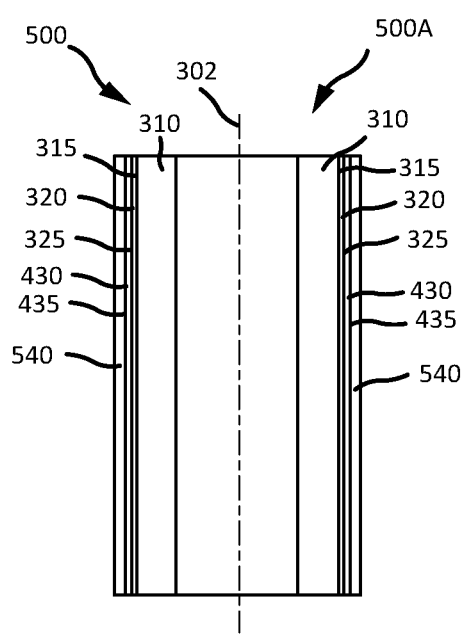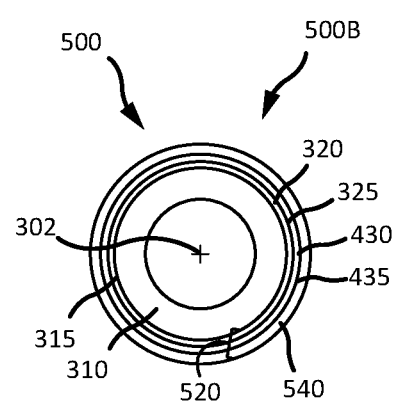
FIG. 5A
FIG. 5B

HEAT RESISTANT SYSTEMS AND METHODS FOR COMPOSITE STRUCTURES

FIELD

This disclosure generally relates to providing heat protection to composite structures.

BACKGROUND

Composite structures (comprising, for example, polymer matrix fiber-reinforced composite material and/or at least one polymer material) in various implementations may be exposed to heat, allowing the possibility that, in response to the heat exposure, the composite structure could appreciably lose structural integrity (partially or fully) and/or ignite. Therefore, composite structures may benefit from being protected from heat exposure such that reduced structural integrity and/or ignition is less likely to occur.

SUMMARY

In various embodiments, a composite structure may comprise a composite core comprising a composite material, and a heat resistant system coupled to the composite core comprising a binder and/or at least one of a heat dissipation material or a thermal barrier material. The heat dissipation material may comprise boron nitride, graphene, graphite, carbon fiber, carbon nanotubes, aluminum foil, and/or copper foil, and the thermal barrier material may comprise montmorillonite, aluminum hydroxide, magnesium hydroxide, silicate glass, mica powder or flake, aluminum oxide powder, titanium dioxide powder, and/or zirconium oxide powder. The binder may comprise at least one of polyvinyl alcohol, polyvinyl alcohol copolyacetate, polyacrylamide, polyethylene glycol, polyethylenimine, polyurethane, polyester, or latex.

In various embodiments, the heat resistant system may comprise the binder and the thermal barrier material to form a thermal barrier layer disposed on a core outer surface of the composite core. The thermal barrier layer may comprise between 50% and 99.9% by weight thermal barrier material. In various embodiments, the heat resistant system may comprise a heat dissipation layer comprising the heat dissipation material disposed between the core outer surface and the thermal barrier layer. In various embodiments, the thermal barrier layer may comprise an intumescent material comprising at least one of polyethylenimine, ammonium phosphate, aluminum phosphate, pentaerythritol, hexametaphosphate, chitosan, melamine cyanurate, melamine phosphate, or a phosphonate oligamer. In various embodiments, the heat resistant system may further comprise an intumescent layer disposed on the thermal barrier layer, wherein the intumescent layer may comprise at least one of polyethylenimine, ammonium phosphate, aluminum phosphate, pentaerythritol, hexametaphosphate, chitosan, melamine cyanurate, melamine phosphate, or a phosphonate oligomer.

In various embodiments, the heat resistant system further may comprise an outer composite layer comprising a second composite material disposed on the thermal barrier layer. The outer composite layer may comprise at least one of an incorporated heat dissipation material, an incorporated thermal barrier material, or an incorporated intumescent material, wherein the incorporated heat dissipation material comprises at least one of boron nitride, graphene, graphite, carbon fiber, carbon nanotubes, aluminum foil, or copper foil, the incorporated thermal barrier material comprises at least one of montmorillonite, aluminum hydroxide, magnesium hydroxide, silicate glass, mica powder or flake, aluminum oxide powder, titanium dioxide powder, or zirconium oxide powder, and the incorporated intumescent material comprises at least one of polyethylenimine, ammonium phosphate, aluminum phosphate, pentaerythritol, hexametaphosphate, chitosan, melamine cyanurate, melamine phosphate, or a phosphonate oligomer. In various embodiments, at least one of the heat dissipation layer or the intumescent layer may comprise a protective mesh comprising at least one of a metal material or a ceramic material, wherein the protective mesh comprises a plurality of pores, wherein each pore is less than about one millimeter in size.

In various embodiments, an aircraft may comprise a landing gear assembly comprising a structural component comprising a composite material, wherein the structural component comprises a composite core and a heat resistant system coupled to the composite core comprising a binder and/or at least one of a heat dissipation material or a thermal barrier material. The heat dissipation material may comprise at least one of boron nitride, graphene, graphite, carbon fiber, carbon nanotubes, aluminum foil, or copper foil, and the thermal barrier material may comprise at least one of montmorillonite, aluminum hydroxide, magnesium hydroxide, silicate glass, mica powder or flake, aluminum oxide powder, titanium dioxide powder, or zirconium oxide powder. The binder may comprise at least one of polyvinyl alcohol, polyvinyl alcohol copolyacetate, polyacrylamide, polyethylene glycol, polyethylenimine, polyurethane, polyester, or latex.

In various embodiments, the heat resistant system may comprise the binder and the thermal barrier material to form a thermal barrier layer disposed on a core outer surface of the composite core. In various embodiments, the heat resistant system may comprise a heat dissipation layer comprising the heat dissipation material disposed between the core outer surface and the thermal barrier layer. In various embodiments, the thermal barrier layer may comprise an intumescent material comprising at least one of polymethylenimine, ammonium phosphate, aluminum phosphate, pentaerythritol, hexametaphosphate, chitosan, melamine cyanurate, melamine phosphate, or a phosphonate oligomer. In various embodiments, the heat resistant system may further comprise an intumescent layer disposed on the thermal barrier layer, wherein the intumescent layer may comprise at least one of polymethylenimine, ammonium phosphate, aluminum phosphate, pentaerythritol, hexametaphosphate, chitosan, melamine cyanurate, melamine phosphate, or a phosphonate oligomer.

In various embodiments, the heat resistant system may further comprise an outer composite layer comprising a second composite material disposed on the thermal barrier layer. In various embodiments, the outer composite layer may comprise at least one of an incorporated heat dissipation material, an incorporated thermal barrier material, or an incorporated intumescent material, wherein the incorporated heat dissipation material comprises at least one of boron nitride, graphene, graphite, carbon fiber, carbon nanotubes, aluminum foil, or copper foil, the incorporated thermal barrier material comprises at least one of montmorillonite, aluminum hydroxide, magnesium hydroxide, silicate glass, mica powder or flake, aluminum oxide powder, titanium dioxide powder, or zirconium oxide powder, and the incorporated intumescent material comprises at least one of polymethylenimine, ammonium phosphate, aluminum phosphate, pentaerythritol, hexametaphosphate, chitosan, melamine cyanurate, melamine phosphate, or a phosphonate oligomer.

In various embodiments, a method may comprise forming a thermal barrier slurry comprising a solvent, a binder, and a thermal barrier material, wherein the binder may comprise at least one of polyvinyl alcohol, polyvinyl alcohol copolyacetate, polyacrylamide, polyethylene glycol, polyethylenimine, polyurethane, polyester, or latex, and the thermal barrier material comprises at least one of montmorillonite, aluminum hydroxide, magnesium hydroxide, silicate glass, mica powder or flake, aluminum oxide powder, titanium dioxide powder, or zirconium oxide powder; and forming a thermal barrier layer on a component of an aircraft landing gear assembly comprising a composite material. In various embodiments, the forming the thermal barrier layer may comprise applying the thermal barrier slurry to the component by at least one of brushing or spraying the thermal barrier slurry onto the component, or dipping the component into the thermal barrier slurry.

In various embodiments, the method may further comprise forming a heat dissipation slurry comprising a second solvent, a second binder, and a heat dissipation material comprising at least one of boron nitride, graphene, graphite, carbon fiber, carbon nanotubes, aluminum foil, or copper foil; and applying the heat dissipation slurry to the component of the aircraft landing gear assembly to form a thermal barrier layer before applying the thermal barrier slurry. In various embodiments, the method may further comprise combining the thermal barrier material with a resin used for forming the composite material to form a thermal barrier resin; applying the thermal barrier resin to fibers to create a thermal barrier composite material; and/or wrapping the thermal barrier composite material around the component to form an outer composite layer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

FIGS. 3A and 3B illustrate cross sectional views of a composite structure having an external heat resistant system, in accordance with various embodiments;

FIGS. 4A and 4B illustrate cross sectional views of a composite structure having a heat resistant system with an outer composite layer, in accordance with various embodiments;

FIGS. 5A and 5B illustrate cross sectional views of a composite structure having a heat resistant system with multiple layers, in accordance with various embodiments.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
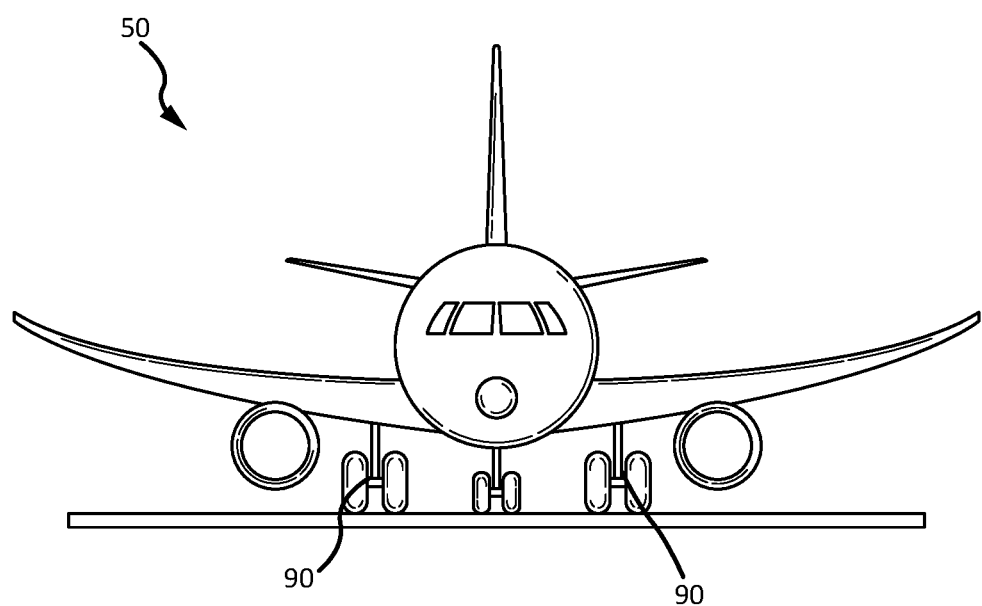
FIG. 1 illustrates a perspective view of an aircraft, in accordance with various embodiments.
Figure 2A:
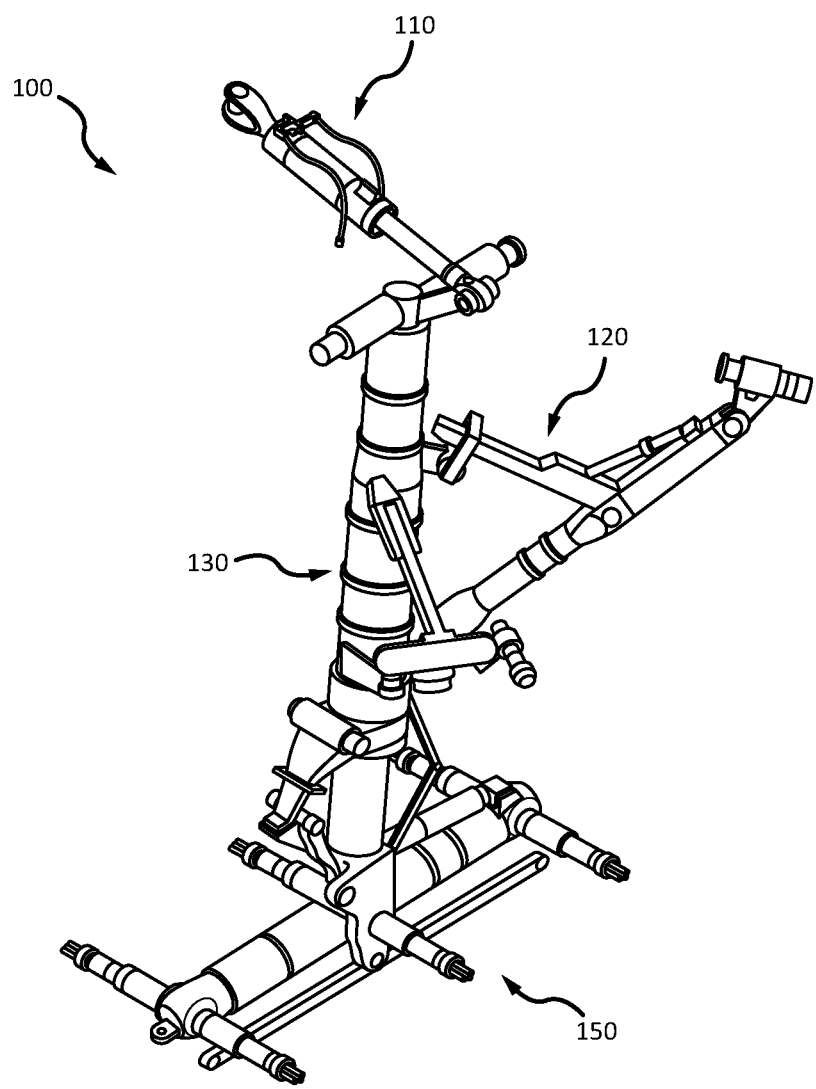
FIG. 2A illustrates a perspective view of an exemplary landing gear assembly, in accordance with various embodiments.
Figure 2B:
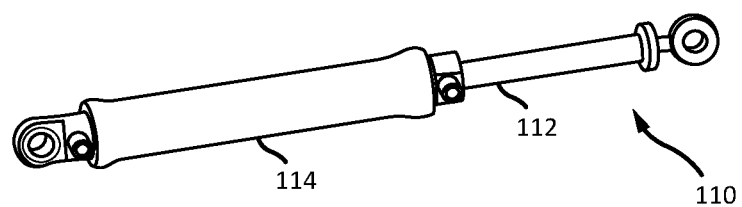
FIG. 2B illustrates a perspective view of an actuator, in accordance with various embodiments.

Aircraft, such as aircraft 50 depicted in FIG. 1, may comprise landing gear 90 which provides mobility for aircraft 50 while on the ground. Referring to FIGS. 2A and 2B, an aircraft may comprise a landing gear assembly 100 configured to retract landing gear after takeoff and/or deploy landing gear before landing. Wheel end 150 of landing gear assembly 100 may couple to the wheels of the aircraft. Landing gear assembly 100 may comprise various rods and shafts comprised in actuators and struts, such as actuator 110, actuator strut 120, and/or main strut 130. For example, actuator 110 shown in FIG. 2B may comprise a housing 114 configured to house a piston 112, which may translate in and out housing 114. To decrease the weight of an aircraft, various components of landing gear assembly 100, such as actuator 110, actuator strut 120, and/or main strut 130 may comprise composite material (e.g., polymer matrix fiber-reinforced composite material and/or polymer matrix composite material). Such components of landing gear assembly 100 comprising composite material may be referred to as "composite structures" herein.

In various embodiments, composite structures in aircraft and other applications may be exposed to significant heat during normal operation, or as a result of an anomalous thermal event, which in some cases, may result in a reduction of the structural integrity and/or ignition of the composite structure. Therefore, the composite structures may comprise a heat resistant system to protect or prevent the composite structure from ignition and/or softening as a result of heat exposure. With reference to FIGS. 3A and 3B, cross sections of a composite structure 300 (e.g., a rod or strut comprised in a landing gear assembly) comprising a heat resistant system 320 are depicted, in accordance with various embodiments. In various embodiments, the composite structure may comprise a composite core 310 disposed about an axis 302. FIG. 3A depicts view 300A, a cross section of composite structure 300 along axis 302, and FIG. 3B depicts view 300B, a cross section of composite structure 300 perpendicular to axis 302. In addition to cylindrical tubular components with circular cross-sections shown as example in FIGS. 3A-4B, other designs can be used as well, for example, components with a solid cross-section, without a cavity, with non-circular cross-sections, with non-constant sizes across the component length, or non-straight (e.g., not following an axis 302).

In various embodiments, heat resistant system 320 may be disposed on a core outer surface 315 of composite core 310, and may be the outermost component of composite structure 300. In various embodiments, heat resistant system 320 may comprise a thermal barrier layer. The thermal barrier layer may comprise a thermal barrier material. In various embodiments the thermal barrier layer may further comprise a binder. The binder may comprise a water-soluble polymer such as polyvinyl alcohol, polyvinyl alcohol copolyacetate, polyacrylamide, polyethylene glycol, polyethylenimine, or non-water-soluble polymer suspended, emulsified, or otherwise mixed in an aqueous solvent medium, such as polyurethane, polyester, or latex. The thermal barrier material may comprise a clay (e.g., montmorillonite), aluminum hydroxide, magnesium hydroxide, silicate glass, mica powder or flake, aluminum oxide powder, titanium dioxide powder, and/or zirconium oxide powder. The thermal barrier material may be a material having low thermal conductivity (e.g., less than 2 watts per meter per degree Celsius, or less than 1 watt per meter per degree Celsius, or less than 0.5 watt per meter per degree Celsius), and may not participate in a combustion reaction (i.e., thermal barrier materials resist burning). The thermal barrier layer may comprise between 20% and 99.9% by weight thermal barrier material, between 50% and 99.9% by weight thermal barrier material, between 60% and 90% by weight thermal barrier material, or between 70% and 80% by weight thermal barrier material. The thermal barrier layer may comprise between 0.01% and 80% by weight binder, between 0.01% and 50% by weight binder, between 10% and 40% by weight binder, or between 20% and 30% by weight binder. The weight percent, as used in this context, means the weight of the subject material (e.g., the thermal barrier material or the binder) over the total weight of the thermal barrier layer.

In various embodiments, the thermal barrier layer in heat resistant system 320 may further comprise a heat dissipation material in addition to the thermal barrier material and/or the binder. The heat dissipation material may be a thermally conductive material configured to dissipate, or spread, heat away from concentrated thermal hotspots on composite structure 300. In various embodiments, the thermal conductivity of the heat dissipation material may be greater than 2 watts per meter per degree Celsius, greater than 10 watts per meter per degree Celsius, or greater than 50 watts per meter per degree Celsius. The heat dissipation material may comprise any suitable material, such as boron nitride, silicon nitride, silicon carbide, graphite, graphene, carbon fiber, carbon nanotubes, aluminum foil, copper foil, and/or the like. The thermal barrier layer may comprise a combination of the thermal barrier material and the heat dissipation material in amounts between 20% and 99.9% by weight, between 50% and 99.9% by weight, between 60% and 90% by weight, or between 70% and 80% by weight. The weight percent, as used in this context, means the weight of the thermal barrier material and the heat dissipation material over the total weight of the thermal barrier layer.

In various embodiments, the thermal barrier layer in heat resistant system 320 may further comprise an intumescent material in addition to the thermal barrier material and the binder. The intumescent material may be instead of, or in addition to, the heat dissipation material. The intumescent material may be a material that reacts in response to combusting or thermally degrading to form a char, foam, or other volatile fire-suppressing species. The intumescent material may comprise any suitable material, such as various nitrogen and/or phosphorus-comprising materials such as melamine cyanurate, melamine phosphate, polymethylenimine, ammonium phosphate, aluminum phosphate, pentaerythritol, hexametaphosphate, and/or phosphonate oligomers, chitosan, metal hydroxides such as aluminum hydroxide and/or magnesium hydroxide, and/or the like. The thermal barrier layer may comprise a combination of the thermal barrier material and the intumescent material and/or the heat dissipation material in amounts between 20% and 99.9% by weight, between 50% and 99.9% by weight, between 60% and 90% by weight, or between 70% and 80% by weight. The weight percent, as used in this context, means the weight of the thermal barrier material and the intumescent material and/or the heat dissipation material over the total weight of the thermal barrier layer.

In various embodiments, the thermal barrier layer may have a thickness of between 1 nanometer (nm) ($3.9e^{-8}$ inch) and 500 micrometers (μm) (0.02 inch) or between 50 nm ($2.0e^{-6}$ inch) and 1000 nm ($3.9e^{-5}$ inch).

In various embodiments, heat resistant system 320 may comprise a heat dissipation layer. The heat dissipation layer may be disposed between the thermal barrier layer and composite core 310. That is, the thermal barrier layer may be the layer furthest from axis 302 and adjacent to heat dissipation layer coupled to composite core 310. The heat dissipation layer may comprise a binder (such as those described in relation to the thermal barrier layer) and a heat dissipation material. The heat dissipation material may be thermally conductive and may comprise boron nitride, silicon nitride, silicon carbide, graphite, graphene, carbon fiber, carbon nanotubes, and/or metal foil (e.g., aluminum foil, copper foil, or the like). In various embodiments, the heat dissipation layer may be thermally conductive and configured to dissipate, or spread, heat away from concentrated thermal hotspots on composite structure 300. Therefore, the thermal barrier layer may block heat, i.e., reflect radiant heat (or absorb or reject conductive heat) applied to composite structure 300 in a direction normal to or substantially normal to the thermal barrier layer's surface. Any heat that is able to travel through the thermal barrier layer may be dissipated by the heat dissipation layer, i.e., the heat dissipation layer may have high heat conductivity in one direction(s) (axially and/or circumferentially relative to axis 302) and low heat conductivity in another direction (radially relative to axis 302), and/or the heat dissipation layer has a high specific heat so that it can absorb a larger amount of heat w/o raising in temperature. In various embodiments, heat resistant system 320 may comprise only a heat dissipation layer, or the thermal barrier layer may be disposed between the heat dissipation layer and composite core 310. In various embodiments, the heat dissipation layer may further comprise an intumescent material.

In various embodiments, the heat dissipation layer may comprise 20% and 99.9% by weight heat dissipation material, between 50% and 99.9% by weight heat dissipation material, between 60% and 90% by weight heat dissipation material, or between 70% and 80% by weight heat dissipation material. In various embodiments, the heat dissipation layer may have a thickness of between 1 nanometer (nm) ($3.9e^{-8}$ inch) and 500 micrometers (μm) (0.02 inch) or between 50 nm ($2.0e^{-6}$ inch) and 1000 nm ($3.9e^{-5}$ inch). In various embodiments, in which the heat dissipation layer comprises a metal foil (e.g., aluminum foil and/or copper foil), the thickness of the metal foil may be between 1 μm ($3.9e^{-5}$ inch) to 1 millimeter (mm) (0.039 inch), between 250 μm (0.0098 inch) to 750 μm (0.030 inch), or between 400 μm (0.016 inch) and 600 μm (0.024 inch).

In various embodiments, heat resistant system 320 may comprise an intumescent layer in addition to, or instead of, the heat dissipation layer. Intumescent layer may be disposed on the thermal barrier layer such that the intumescent layer may be the outermost layer of heat resistant system 320 furthest from axis 302. In various embodiments, heat resistant system 320 may comprise only the intumescent layer. The intumescent layer may comprise a binder (such as those described in relation to the thermal barrier layer) and an intumescent material. The intumescent material may be a material that reacts in response to combusting or thermally degrading to form a char, foam, or other volatile fire-suppressing species. Therefore, the intumescent layer may be configured to suppress heat or flame in response to the intumescent material in the intumescent layer combusting or thermally degrading. The intumescent material in the intumescent layer may comprise any suitable material such as various nitrogen and/or phosphorus-comprising materials such as melamine cyanurate, melamine phosphate, polymethylenimine, ammonium phosphate, aluminum phosphate, pentaerythritol, hexametaphosphate, and/or phosphonate oligomers, chitosan, metal hydroxides such as aluminum hydroxide, magnesium hydroxide, and/or the like.

In various embodiments, the intumescent layer may comprise 20% and 99.9% by weight intumescent material, between 50% and 99.9% by weight intumescent material, between 60% and 90% by weight intumescent material, or between 70% and 80% by weight intumescent material. In various embodiments, the intumescent layer may have a thickness of between 1 nanometer (nm) ($3.9e^{-8}$ inch) and 500 micrometers (μm) (0.02 inch) or between 50 nm ($2.0e^{-6}$ inch) and 1000 nm ($3.9e^{-5}$ inch).

In various embodiments, a protective mesh comprised of any suitable non-combustible material (e.g., metal material, ceramic material), such as a metal screens, scrims, and/or weaves, and/or ceramic (e.g., glass, such as silica glass) screens, scrims, fabrics, and/or nonwoven articles, may be incorporated into heat resistant system 320. For example, a protective mesh may be incorporated into the heat dissipation layer, the thermal barrier layer, and/or the intumescent material layer. The protective mesh may have a flame-arresting effect, in that it may help block a flame from contacting any layers below the protective mesh relative to axis 302. In various embodiments, a protective mesh having pores of about 1 mm (0.039 inch) or less in size may block a flame from a combusting hydrocarbon because such a pore size will not allow the flame through, and instead, may have a quenching effect. As used in this context only, the term "about" means plus or minus 0.5 mm. In various embodiments, the protective mesh may have a thickness of between 1 μm ($3.9e^{-5}$ inch) to 1 millimeter (mm) (0.039 inch), between 250 μm (0.0098 inch) to 750 μm (0.030 inch), or between 400 μm (0.016 inch) and 600 μm (0.024 inch).

In accordance with various embodiments, FIGS. 4A and 4B depict cross sections of a composite structure 400 (e.g., a rod or strut comprised in a landing gear assembly). FIG. 4A depicts view 400A, a cross section of composite structure 400 along axis 302, and FIG. 4B depicts view 400B, a cross section of composite structure 400 perpendicular to axis 302. In various embodiments, composite structure 400 comprises a heat resistant system 420 which may comprise heat resistant system 320 (discussed in relation to FIGS. 3A and 3B) and an outer composite layer 430, collectively creating heat resistant system 420.

In various embodiments, outer composite layer 430 may be the outermost layer of heat resistant system 420 furthest from axis 302. Outer composite layer 430 may comprise the same material as composite core (e.g., fiber-reinforced polymer), or a different material, which may aid in composite structure's 400 interface (e.g., contact and friction) with other components of a landing gear system, for example, comprising the same or similar materials. In various embodiments, outer composite layer 430 may be a sacrificial outer layer in the event of a fire. In other words, outer composite layer 430 may be present to aid in mechanical functions (e.g., contact and friction with other components in a landing gear assembly), but may burn away in a fire such that the remaining heat resistant system 320 protects composite core 310.

In various embodiments, various heat resistant additives may be included in outer composite layer 430 along with the composite material to increase heat resistance. Outer composite layer 430 may comprise a thermal barrier material, a heat dissipation material, an intumescent material, and/or ionic liquids. The thermal barrier material, heat dissipation material, and/or intumescent material comprised in outer composite layer 430 may comprise any of the compounds discussed herein in relation to the thermal barrier layer, heat dissipation layer, and/or intumescent layer, respectively. The ionic liquid may comprise an imidazolium and/or pyridinium cation and at least one of a phosphate and/or halogen anion. In various embodiments, the resin used to form the composite material of the outer composite layer 430 may be modified by including any of the compounds described above as additives, forming a heat resistant resin. The heat resistant resin may be applied to the fibers to create heat resistant composite material, which may be applied to heat resistant system 320 (e.g., by being wrapped around heat resistant system 320 at a heat resistant system outer edge 325) to form outer composite layer 430.

In various embodiments, a protective mesh and/or metal foil (as described above in relation to FIGS. 3A and 3B) may be disposed adjacent to outer composite layer 430 as part of heat resistant system 420. A protective mesh or metal foil may be disposed on a composite layer outer surface 435 of outer composite layer 430 and/or on heat resistant system outer edge 325.

In accordance with various embodiments, FIGS. 5A and 5B depict cross sections of a composite structure 500 (e.g., a rod or strut comprised in a landing gear assembly). FIG. 5A depicts view 500A, a cross section of composite structure 500 along axis 302, and FIG. 5B depicts view 500B, a cross section of composite structure 500 perpendicular to axis 302. In various embodiments, composite structure 500 comprises a heat resistant system 520 which may comprise heat resistant system 320 (discussed in relation to FIGS. 3A and 3B), an outer composite layer 430, and a protection layer 540, collectively creating heat resistant system 520. Protection layer 540 may comprise any of the layers discussed herein, serving to provide an initial or "first line" of defense against extreme heat or fire before reaching outer composite layer 430. For example, protection layer 540 may comprise a thermal barrier layer, heat dissipation layer, intumescent layer, a protective mesh, metal foil, and/or a composite layer comprising any of the additives discussed in relation to outer composite layer 430 (e.g., additives of thermal barrier material, heat dissipation material, and/or intumescent material). Protection layer 540 may be any combination of the previous layers.

The efficacy of the heat resistant systems discussed herein in protecting a composite structure from damage from heat was tested by applying a flame directly to two composite structures. The first composite structure comprised no heat resistant system, while the second composite structure comprised a heat resistant system comprising a thermal barrier layer disposed on the composite structure as the outermost layer. The thermal barrier layer comprised polyvinyl alcohol and montmorillonite. After 30 seconds of flame exposure, the first composite structure ignited. However, the second composite structure did not ignite after 60 seconds of flame exposure, demonstrating the heat resistant system's efficacy at protecting the composite structure from heat damage.

It should be appreciated that the layers comprised in the heat resistant systems described herein could be disposed in any suitable order spanning from composite core 310 to the outermost layer of the heat resistant system. For example, a heat resistant system could comprise a heat dissipation layer adjacent to composite core 310, and then moving outward away from axis 302, a first composite layer (e.g., any of the material make-ups of outer composite layer 430), a thermal barrier layer, a second composite layer (e.g., again, any of the material make-ups of outer composite layer 430), and an intumescent layer. It should also be appreciated, that while this disclosure is described in the context of landing gear components for an aircraft, the systems and methods described herein may be implemented in various other contexts (e.g., other composite structures in an aircraft, automobiles, boats, or any composite structure that may experience extreme heat and risk fire).

Figure 6:
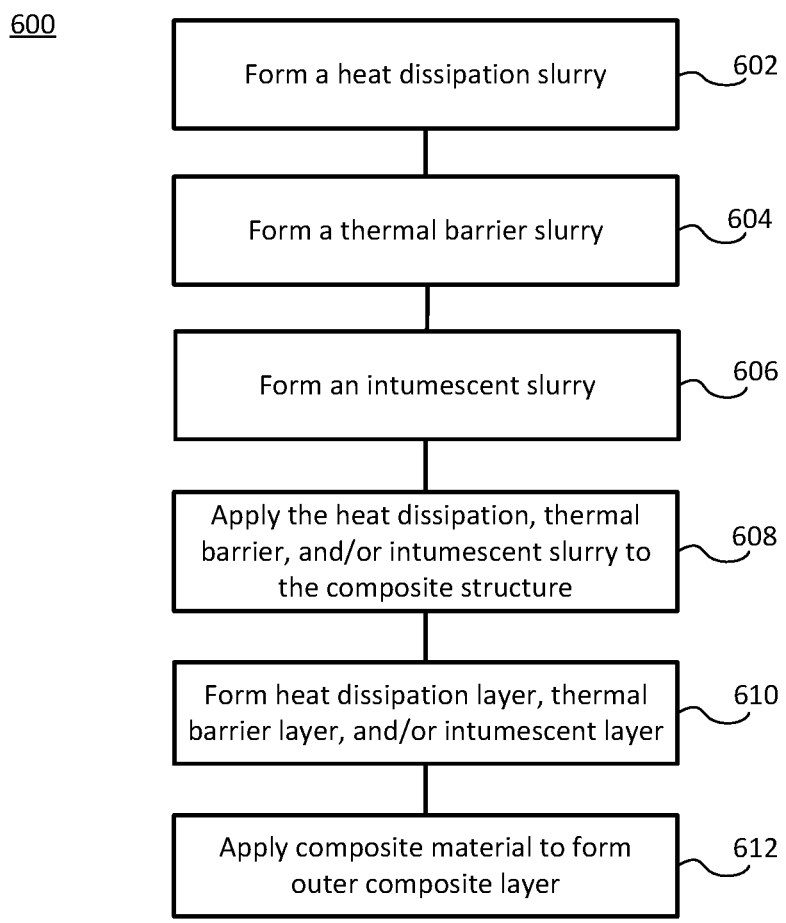
FIG. 6 illustrates a method for forming a heat resistant system on a composite structure, in accordance with various embodiments.

FIG. 6 depicts a method 600 for forming a heat resistant system on a composite structure (e.g., a component of a landing gear assembly), in accordance with various embodiments. In various embodiments, a heat dissipation slurry may be formed (step 602) by combining a binder and a heat dissipation material in a solvent (e.g., water). The binder and the heat dissipation material may be any of the materials discussed herein. In various embodiments, a thermal barrier slurry may be formed (step 604) by combining a binder and a thermal barrier material in a solvent (e.g., water). The binder and the thermal barrier material may be any of the materials discussed herein. In various embodiments, an intumescent slurry may be formed (step 606) by combining a binder and an intumescent material in a solvent (e.g., water). The binder and the intumescent material may be any of the materials discussed herein.

In various embodiments, the heat dissipation slurry, thermal barrier slurry, and/or intumescent slurry may be applied to the composite structure (step 608) in any desired number or order and in any suitable manner. The application of such slurries may be completed, for example, by brushing and/or spraying the slurry on the composite structure, and/or dipping the composite structure in any of the slurries. After each application of one of the slurries to the composite structure, the respective layer(s) may be formed (step 610) (e.g., by drying each slurry). In other words, drying the heat dissipation slurry forms the heat dissipation layer, drying the thermal barrier slurry forms the thermal barrier layer, and drying the intumescent slurry forms the intumescent layer). As an example, the thermal barrier slurry may be applied to a composite structure by brushing, spraying, dipping the composite structure in the thermal barrier slurry, or in any other suitable manner. Subsequently, the applied thermal barrier slurry may be dried to form the thermal barrier layer. In various embodiments, as described herein, the thermal barrier layer may be the only layer in the heat resistant system. In various embodiments, the heat dissipation slurry may be applied to the composite structure and dried to form a heat dissipation layer before. In various embodiments, subsequent to the formation of the heat dissipation layer, the thermal barrier slurry may be applied to the composite structure and dried to form a thermal barrier slurry on the heat dissipation layer. In various embodiments, the heat resistant system may comprise an intumescent layer, which may be formed by applying the intumescent slurry on the thermal barrier layer and drying the intumescent slurry to form an intumescent layer.

In various embodiments, a thermal barrier layer may be formed by wrapping the composite structure in a fiber comprising a thermal barrier material such as silica glass. In various embodiments, a heat dissipation layer may be formed wrapping the composite structure with a metal foil (e.g., aluminum foil, copper foil, or the like). In various embodiments, a protective mesh may be incorporated into any of the layers of the heat resistant system described herein.

In various embodiments, as described here, the heat resistant system on a composite structure may comprise an outer composite layer (e.g., outer composite layer 430 in FIGS. 4A and 4B). To form the outer composite layer, composite material may be applied (step 612) to the previously applied layers of the heat resistant system. For example, if the heat resistant system on a composite structure comprises a thermal barrier layer as the outermost layer, composite material may be applied (e.g., wrapped) to the thermal barrier layer of the composite structure. Any additional layers for the heat resistant system may be subsequently applied to an outer composite material.

In various embodiments, as described herein, the outer composite layer may comprise various additives to allow the outer composite layer to be more effective for fire resistance. In forming the composite material used to form the outer composite layer, resin (e.g., a polymeric resin) may be applied to fibers. Any of the additives described herein may be added to the resin (creating a heat resistant resin) to incorporate into the composite material used to form the outer composite layer. In response, the composite material comprising an additive(s) may be applied to the existing layers of the heat resistant system (e.g., heat dissipation layer, thermal barrier layer, and/or intumescent layer) to form a heat resistant outer composite layer. For example, a thermal barrier material (e.g., montmorillonite) may be added to the resin used for forming the composite material, resulting in thermal barrier resin. The thermal barrier resin may be applied to fibers to create composite material (e.g., a thermal barrier composite material). The thermal barrier composite material may be wrapped around the composite structure (including any heat resistant layers already present) to form the outer composite layer. The outer composite layer may be heat resistant because it comprises a thermal barrier material(s) which may not participate in combustion or thermal degradation.

Incorporation of any other additives described herein may be completed in a similar manner. For example, a heat dissipation material, intumescent material, and/or ionic liquids discussed herein may be added to the resin used for forming the composite material, resulting in a heat resistant resin. Subsequently, the heat resistant resin may be applied to fibers to create heat resistant composite material, which may be applied to the composite structure including any heat resistant layers already applied to the composite structure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite structure, comprising:
    a composite core comprising a composite material; and
    a heat resistant system coupled to the composite core comprising:
        a thermal barrier layer disposed on a core outer surface of the composite core, the thermal barrier layer comprising a thermal barrier material and a binder, wherein the thermal barrier material comprises at least one of montmorillonite, aluminum hydroxide, magnesium hydroxide, silicate glass, mica powder or flake, aluminum oxide powder, titanium dioxide powder, or zirconium oxide powder; and
        a heat dissipation layer comprising a heat dissipation material disposed between the core outer surface and the thermal barrier layer,
        wherein the binder comprises at least one of polyvinyl alcohol, polyvinyl alcohol copolyacetate, polyacrylamide, polyethylene glycol, polyethylenimine, polyurethane, polyester, or latex, and
        wherein the thermal barrier layer comprises between 50% and 99.9% by weight thermal barrier material.

2. The composite structure of claim 1, wherein the thermal barrier layer comprises an intumescent material comprising at least one of polymethylenimine, ammonium phosphate, aluminum phosphate, pentaerythritol, hexametaphosphate, chitosan, melamine cyanurate, melamine phosphate, or a phosphonate oligamer.

3. The composite structure of claim 1, wherein the heat resistant system further comprises an intumescent layer disposed on the thermal barrier layer, wherein the intumescent layer comprises at least one of polymethylenimine, ammonium phosphate, aluminum phosphate, pentaerythritol, hexametaphosphate, chitosan, melamine cyanurate, melamine phosphate, or a phosphonate oligomer.

4. The composite structure of claim 3, wherein at least one of the heat dissipation layer or the intumescent layer comprises a protective mesh comprising at least one of a metal material or a ceramic material, wherein the protective mesh comprises a plurality of pores, wherein each pore is less than about one millimeter in size.

5. The composite structure of claim 1, wherein the heat resistant system further comprises an outer composite layer comprising a second composite material disposed on the thermal barrier layer.

6. The composite structure of claim 5, wherein the outer composite layer comprises at least one of an incorporated heat dissipation material, an incorporated thermal barrier material, or an incorporated intumescent material, wherein the incorporated heat dissipation material comprises at least one of boron nitride, graphene, graphite, carbon fiber, carbon nanotubes, aluminum foil, or copper foil, the incorporated thermal barrier material comprises at least one of montmorillonite, aluminum hydroxide, magnesium hydroxide, silicate glass, mica powder or flake, aluminum oxide powder, titanium dioxide powder, or zirconium oxide powder, and the incorporated intumescent material comprises at least one of polymethylenimine, ammonium phosphate, aluminum phosphate, pentaerythritol, hexametaphosphate, chitosan, melamine cyanurate, melamine phosphate, or a phosphonate oligomer.

7. An aircraft comprising:
    a landing gear assembly comprising a structural component comprising a composite material, wherein the structural component comprises a composite core and a heat resistant system coupled to the composite core comprising:
        a thermal barrier layer disposed on a core outer surface of the composite core, the thermal barrier layer comprising a thermal barrier material and a binder, wherein the thermal barrier material comprises at least one of montmorillonite, aluminum hydroxide, magnesium hydroxide, silicate glass, mica powder or flake, aluminum oxide powder, titanium dioxide powder, or zirconium oxide powder; and a heat dissipation layer comprising a heat dissipation material disposed between the core outer surface and the thermal barrier layer, wherein the binder comprises at least one of polyvinyl alcohol, polyvinyl alcohol copolyacetate, polyacrylamide, polyethylene glycol, polyethylenimine, polyurethane, polyester, or latex, and wherein the thermal barrier layer comprises between 50% and 99.9% by weight thermal barrier material.

8. The aircraft of claim 7, wherein the thermal barrier layer comprises an intumescent material comprising at least one of polymethylenimine, ammonium phosphate, aluminum phosphate, pentaerythritol, hexametaphosphate, chitosan, melamine cyanurate, melamine phosphate, or a phosphonate oligomer.

9. The aircraft of claim 7, wherein the heat resistant system further comprises an intumescent layer disposed on the thermal barrier layer, wherein the intumescent layer comprises at least one of polymethylenimine, ammonium phosphate, aluminum phosphate, pentaerythritol, hexametaphosphate, chitosan, melamine cyanurate, melamine phosphate, or a phosphonate oligomer.

10. The aircraft of claim 7, wherein the heat resistant system further comprises an outer composite layer comprising a second composite material disposed on the thermal barrier layer.

11. The aircraft of claim 10, wherein the outer composite layer comprises at least one of an incorporated heat dissipation material, an incorporated thermal barrier material, or an incorporated intumescent material, wherein the incorporated heat dissipation material comprises at least one of boron nitride, graphene, graphite, carbon fiber, carbon nanotubes, aluminum foil, or copper foil, the incorporated thermal barrier material comprises at least one of montmorillonite, aluminum hydroxide, magnesium hydroxide, silicate glass, mica powder or flake, aluminum oxide powder, titanium dioxide powder, or zirconium oxide powder, and the incorporated intumescent material comprises at least one of polymethylenimine, ammonium phosphate, aluminum phosphate, pentaerythritol, hexametaphosphate, chitosan, melamine cyanurate, melamine phosphate, or a phosphonate oligomer.

* * * * *